United States Patent
Stanley et al.

(10) Patent No.: US 9,731,934 B2
(45) Date of Patent: Aug. 15, 2017

(54) ELEVATOR PASSENGER INTERFACE INCLUDING IMAGES FOR REQUESTING ADDITIONAL SPACE ALLOCATION

(75) Inventors: Jannah A. Stanley, Portland, CT (US); Michael P. Flynn, Avon, CT (US); Matthew Joyce, Avon, CT (US); Vijay Jayachandran, West Hartford, CT (US); Tarique Faruki, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 432 days.

(21) Appl. No.: 14/373,699

(22) PCT Filed: Jan. 24, 2012

(86) PCT No.: PCT/US2012/022313
§ 371 (c)(1),
(2), (4) Date: Jul. 22, 2014

(87) PCT Pub. No.: WO2013/112134
PCT Pub. Date: Aug. 1, 2013

(65) Prior Publication Data
US 2015/0068848 A1 Mar. 12, 2015

(51) Int. Cl.
*B66B 1/34* (2006.01)
*B66B 1/24* (2006.01)
(Continued)

(52) U.S. Cl.
CPC ............ *B66B 1/2408* (2013.01); *B66B 1/468* (2013.01); *G06F 3/04817* (2013.01);
(Continued)

(58) Field of Classification Search
CPC ..... B66B 1/2408; B66B 1/4568; B66B 1/468; B66B 2201/222; B66B 2201/4615; B66B 2201/463; G06F 3/04817; G06F 3/04842
(Continued)

(56) References Cited

U.S. PATENT DOCUMENTS 5,487,451 A * 1/1996 Hughes ................. B66B 1/3476
187/392
5,689,094 A 11/1997 Friedli et al.
(Continued)

FOREIGN PATENT DOCUMENTS

JP H11146391 A 5/1999
JP 2000086095 3/2000
(Continued)

OTHER PUBLICATIONS

International Preliminary Report on Patentability for International application No. PCT/US2012/022313 dated Aug. 7, 2014.
(Continued)

*Primary Examiner* — Anthony Salata
(74) *Attorney, Agent, or Firm* — Carlson, Gaskey & Olds

(57) ABSTRACT

An exemplary elevator destination entry system includes a passenger interface device that presents a visual representation of at least one item that will accompany a passenger on an elevator car. The passenger interface allows the passenger to select the visual representation. A controller is configured to receive indications of passenger requests for elevator service and an indication from the passenger interface device regarding a selected visual representation. The controller determines an amount of space within an elevator car required to accommodate the item based on predetermined space information corresponding to the selected visual representation. The controller assigns a car to a passenger request based on a determination that the assigned car will have adequate space to accommodate the passenger and the item.

18 Claims, 2 Drawing Sheets

(51) Int. Cl.
*B66B 1/46* (2006.01)
*G06F 3/0481* (2013.01)
*G06F 3/0484* (2013.01)

(52) U.S. Cl.
CPC .... *G06F 3/04842* (2013.01); *B66B 2201/222* (2013.01); *B66B 2201/463* (2013.01); *B66B 2201/4615* (2013.01)

(58) Field of Classification Search
USPC ............. 187/380–389, 391, 393, 395, 396
See application file for complete search history.

(56) References Cited

U.S. PATENT DOCUMENTS

| | | | |
|---|---|---|---|
| 6,382,363 B1 | 5/2002 | Friedli | |
| 6,801,792 B1 | 10/2004 | Schuster et al. | |
| 7,140,469 B2 * | 11/2006 | Deplazes | B66B 1/3476 |
| | | | 187/316 |
| 7,281,610 B2 | 10/2007 | Ylinen et al. | |
| 7,353,915 B2 | 4/2008 | Zaharia et al. | |
| 7,490,698 B2 | 2/2009 | Sirag, Jr. | |
| 7,610,995 B2 * | 11/2009 | Ylinen | B66B 1/34 |
| | | | 187/381 |
| 7,712,586 B2 * | 5/2010 | Legez | B66B 1/20 |
| | | | 187/387 |
| 7,793,762 B2 | 9/2010 | Zaharia et al. | |
| 8,020,672 B2 * | 9/2011 | Lin | B66B 1/34 |
| | | | 187/316 |
| 8,047,334 B2 * | 11/2011 | Christy | B66B 1/2458 |
| | | | 187/384 |
| 8,210,321 B2 * | 7/2012 | Finschi | B66B 1/18 |
| | | | 187/388 |
| 8,230,979 B2 | 7/2012 | Finschi et al. | |
| 8,316,997 B2 * | 11/2012 | Mitsuda | B66B 1/2458 |
| | | | 187/384 |
| 8,584,811 B2 * | 11/2013 | Kuoppala | B66B 1/468 |
| | | | 187/316 |
| 8,763,762 B2 * | 7/2014 | Finschi | B66B 1/468 |
| | | | 187/391 |
| 9,125,779 B2 * | 9/2015 | Hyde | A61G 1/0275 |
| 9,382,095 B2 * | 7/2016 | Rusanen | B66B 1/468 |
| 9,481,548 B2 * | 11/2016 | Siddiqui | B66B 1/2416 |
| 2008/0169159 A1 | 7/2008 | Finschi et al. | |
| 2009/0308695 A1 | 12/2009 | Christy et al. | |

FOREIGN PATENT DOCUMENTS

| | | |
|---|---|---|
| JP | 2000338602 A | 12/2000 |
| JP | 2003267637 A | 9/2003 |
| JP | 2009120348 A | 6/2009 |
| JP | 2010173825 A | 8/2010 |
| WO | 2009125468 A1 | 10/2009 |

OTHER PUBLICATIONS

International Search Report and Written Opinion of the International Searching Authority for International application No. PCT/US012/022313 dated Aug. 30, 2012.

* cited by examiner

ELEVATOR PASSENGER INTERFACE INCLUDING IMAGES FOR REQUESTING ADDITIONAL SPACE ALLOCATION

BACKGROUND

Modern elevator systems allow passengers to request elevator service in various ways. Some systems provide conventional hall call buttons that allow a passenger to indicate a desire to travel up or down from a particular landing. A car operating panel in an elevator car allows the passenger to indicate the floor to which the passenger desires to travel. Other systems include destination entry passenger interfaces that allow a passenger to indicate a desired destination before the passenger boards an elevator car. Such systems assign an elevator car to each passenger according to known car assignment algorithms.

The destination entry systems can improve elevator service for passengers by handling larger traffic volumes more efficiently and avoiding elevator lobby crowding, for example. One issue presented by such systems, however, is that the car assignments are made without any information regarding the actual space requirements of any particular passenger. If a passenger has a large item or other people that will also be on the elevator car, that space requirement is not accounted for by the car assignment algorithm. It is possible, therefore, to have crowded elevator cars.

One attempt at addressing this situation is disclosed in U.S. Patent Application Publication No. 2009/0308695. That solution allows a passenger to indicate a need for additional space on an elevator car

SUMMARY

An exemplary elevator destination entry system includes a passenger interface device that presents a visual representation of at least one item that will accompany a passenger on an elevator car. The passenger interface allows the passenger to select the visual representation. A controller is configured to receive indications of passenger requests for elevator service and an indication from the passenger interface device regarding a selected visual representation. The controller determines an amount of space within an elevator car required to accommodate the item based on predetermined space information corresponding to the selected visual representation. The controller assigns a car to a passenger request based on a determination that the assigned car will have adequate space to accommodate the passenger and the item.

An exemplary method of controlling car assignments in an elevator destination entry system includes providing a visual representation, on a passenger interface, of at least one item that will accompany a passenger on an elevator car. A determination is made that a passenger used the passenger interface to indicate that the passenger has at least one item that will accompany the passenger on an elevator car corresponding to a selected visual representation. An amount of space within an elevator car required to accommodate the item is determined based on predetermined space information corresponding to the selected visual representation. An elevator car that has the required space available is assigned to the passenger.

The various features and advantages of a disclosed example embodiment will become apparent to those skilled in the art from the following detailed description. The drawings that accompany the detailed description can be briefly described as follows.

DETAILED DESCRIPTION

Figure 1:
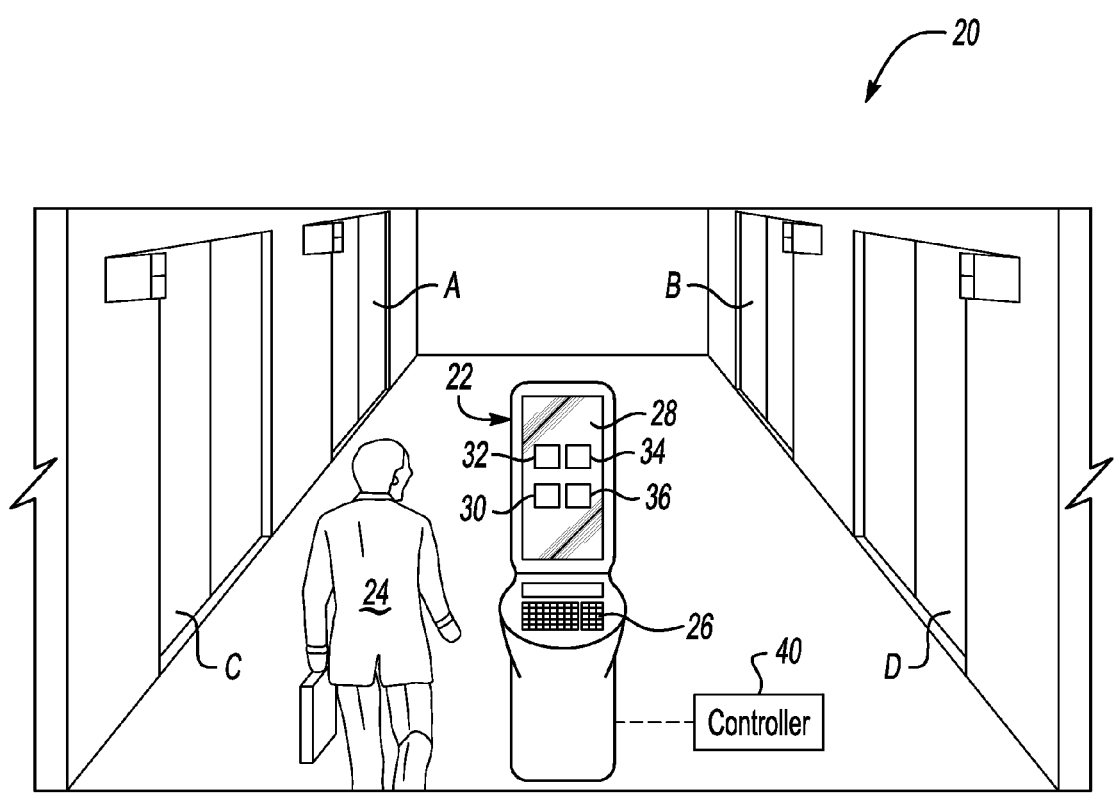
FIG. 1 schematically illustrates selected portions of an elevator system designed according to an embodiment of this invention.

FIG. 1 schematically shows selected portions of an elevator system 20. A passenger interface 22 facilitates a passenger 24 making a request for elevator service. In the illustrated example, the passenger interface 22 is part of a destination entry system in which the passenger 24 indicates a desired destination before the passenger 24 enters an elevator car.

An input portion 26 allows the passenger to indicate a particular floor of the building to which the passenger 24 wishes to travel. In some examples, the input portion 26 comprises a key pad. A display portion 28 provides information to the passenger 24 such as instructions for using the passenger interface 22, which of the cars A, B, C or D is assigned to carry that passenger to the desired destination, for example. In some examples, the display portion 28 comprises a touch screen that is useable as an input component.

The passenger interface 22 facilitates elevator car assignments that take into account any special space requirements of each passenger. The display portion 28 presents a visual representation of at least one item that will accompany a passenger on an elevator car. The passenger interface 22 allows the passenger 24 to select an appropriate visual representation corresponding to such an item. The illustrated example includes four visual representations schematically shown at 30, 32, 34 and 36. Each of the visual representations comprises an image or icon that corresponds to a particular item or items, for example. In some examples, at least one of the visual representations is included on a dedicated button that is part of the input portion 26.

A controller 40 is configured to receive indications of passenger requests for elevator service entered through the passenger interface 22 and to make elevator car assignments according to a selected destination dispatch algorithm, which can be a known algorithm. The controller 40 also receives an indication from the passenger interface 22 regarding a selected visual representation. The controller 40 determines an amount of space within an elevator car required to accommodate the item based on predetermined space information corresponding to the selected visual representation. The controller 40 assigns a car A-D to a passenger request based on a determination that the assigned car will have adequate space to accommodate the passenger and the item.

Figure 2:
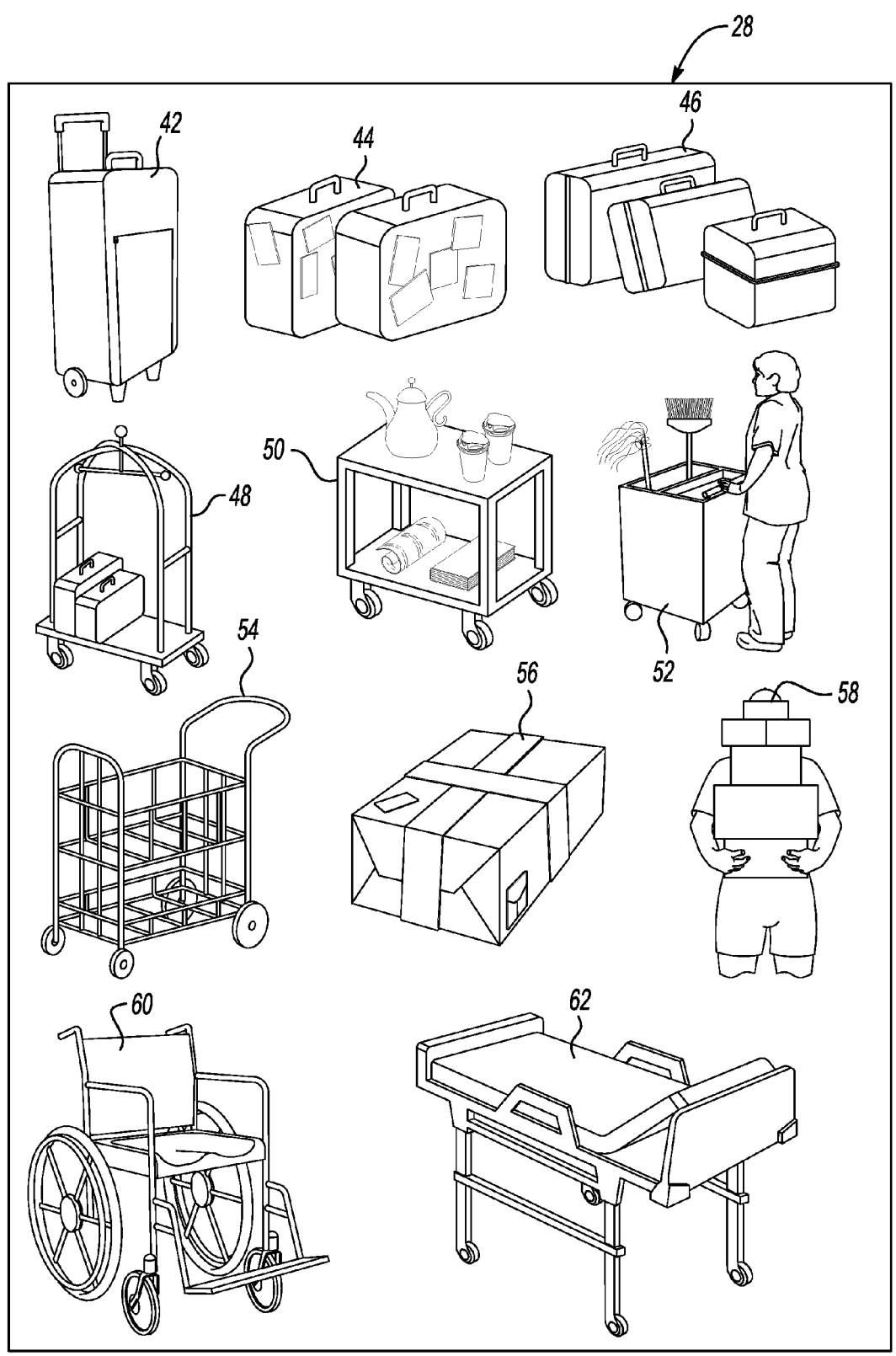
FIG. 2 schematically illustrates an example passenger interface useful with the example of FIG. 1.

One feature of the illustrated example is that the visual representations correspond to the item or items that a passenger desires to bring on the elevator car. FIG. 2 illustrates an example display screen 28 that includes a plurality of visual representations corresponding to items that would possibly be brought by a passenger onto an elevator. In this example, some of the visual representations pertain to different items while others pertain to different numbers of the same type of item. The passenger 24 can easily select a visual representation corresponding to that which the passenger will bring onto the elevator car.

This example has a first visual representation 42 of a single piece of luggage. Another visual representation 44 corresponds to two pieces of luggage while a third visual representation 46 shows three pieces of luggage. A passenger who has two pieces of luggage can select the visual representation 44 by touching the corresponding portion of the screen if the display 28 comprises a touch screen. Other techniques can be used to select an appropriate visual representation.

The controller 40 has information regarding an amount of space corresponding to each of the visual representations. Depending on which one of the visual representations, if any, a passenger selects, the controller 40 determines how much space to allocate for that passenger when making a car assignment for that passenger. The controller 40 also maintains information regarding those space requirements when considering further assignments to the same car until that car has arrived at that passenger's intended destination.

The illustrated example also includes visual representations of a luggage cart 48, a food service cart 50 and custodial items 52 such as a laundry cart or a housekeeping cart. Each of the visual representations 42-52 are useful in a hotel building, for example. Others of the example visual representations are useful in office or hospital settings, for example. The visual representation 54 shows a cart that may be used for deliveries or as a mail cart, for example. The visual representation 56 shows a single package and the visual representation 58 shows multiple packages. The visual representation 60 shows a wheelchair and the visual representation 62 shows a hospital bed or an ambulance gurney.

The disclosed embodiment allows for customized visual representations to be used depending on the needs of a particular situation. Passenger interfaces 22 in buildings located on a coast, for example, can include visual representations of a surf board or scuba gear. Passenger interfaces 22 in buildings near ski resorts may include visual representations of skis or snowboards, for example. In each instance, the controller 40 has information regarding an appropriate amount of space required to accommodate each such item.

Other visual representations indicate a number of individuals accompanying a passenger. For example, a passenger may have a friend or her family with her and can select a visual representation showing the number of people with her. This eliminates a need for each of them to make their own request in order for the controller 40 to know how many people will be on the assigned elevator car.

Each of the visual representations corresponds to a different amount of space required to accommodate the represented item. The controller 40 has predetermined information regarding an appropriate amount of space needed on an elevator car for each such item. The controller 40 uses that information as described above. The illustrated example, therefore, facilitates car assignments that reserve an appropriate amount of space within an elevator car depending on the item or items. The passengers can easily indicate a need for additional space by selecting an appropriate visual representation.

The preceding description is exemplary rather than limiting in nature. Variations and modifications to the disclosed example may become apparent to those skilled in the art that do not necessarily depart from the essence of this invention. The scope of legal protection given to this invention can only be determined by studying the following claims.

We claim:
1. An elevator destination entry system, comprising:
a passenger interface device that presents a plurality of visual representations, each of the visual representations comprising at least one of an image of at least one item that will accompany a passenger on an elevator car or an icon corresponding to the at least one item, the visual representations each corresponding to a differently sized item, the passenger interface allowing the passenger to select at least one of the visual representations; and
a controller configured to
receive indications of passenger requests for elevator service and an indication from the passenger interface device regarding a selected visual representation,
determine an amount of space within an elevator car required to accommodate the item based on the selected visual representation and predetermined space information that the controller has corresponding to the selected visual representation, and
assign a car to a passenger request based on a determination that the assigned car will have adequate space to accommodate the passenger and the item.

2. The system of claim 1, wherein the controller uses information regarding the space to accommodate the item when determining whether to make any subsequent assignments to the assigned car until the passenger has been carried to an intended destination.

3. The system of claim 1, wherein each of the visual representations pertains to a different item.

4. The system of claim 3, wherein the visual representations comprise representations of at least two of
a room service cart,
a laundry cart,
a housekeeping cart,
a custodial item,
a package,
luggage, and
a luggage cart.

5. The system of claim 3, wherein the visual representations comprise representations of at least two of
a mail cart,
a delivery cart,
a package, and
a custodial.

6. The system of claim 3, wherein the visual representations comprise representations of at least two of
a bed,
a medical equipment cart,
a food cart,
a housekeeping cart,
a laundry cart, and
a custodial item.

7. The system of claim 1, wherein at least some of the visual representations each represents a different number of items.

8. The system of claim 7, wherein the some of the visual representations comprise a different number of at least one of
packages, and
luggage.

9. The system of claim 1, wherein
the passenger interface presents a menu of available visual representations responsive to passenger input indicating that the passenger needs space allocated to accommodate an item on an elevator car; and the passenger interface determines which of a plurality of preconfigured representations to present in the menu based on the passenger input.

10. A method of controlling car assignments in an elevator destination entry system, comprising the steps of:
providing a plurality of visual representations, on a passenger interface, each of the visual representations comprising at least one of an image of at least one item that will accompany a passenger on an elevator car or an icon corresponding to the at least one item, the visual representations each corresponding to a differently sized item;
using a controller for determining that a passenger used the passenger interface to indicate that the passenger has at least one item that will accompany the passenger on an elevator car corresponding to a selected visual representation;
using the controller for determining an amount of space within an elevator car required to accommodate the item based on the selected visual representation and predetermined space information that the controller has corresponding to the selected visual representation; and
assigning an elevator car that has the required space available to the passenger.

11. The method of claim 10, comprising
using information regarding the required space when determining whether to make any subsequent assignments to the assigned car until the passenger has been carried to an intended destination.

12. The method of claim 10, wherein each of the visual representations pertains to a different item.

13. The method of claim 12, wherein the visual representations comprise representations of at least two of
a room service cart,
a laundry cart,
a housekeeping cart,
a custodial item,
a package,
luggage, and
a luggage cart.

14. The method of claim 12, wherein the visual representations comprise representations of at least two of
a mail cart,
a delivery cart,
a package, and
a custodial.

15. The method of claim 12, wherein the visual representations comprise representations of at least two of
a bed,
a medical equipment cart,
a food cart,
a housekeeping cart,
a laundry cart, and
a custodial item.

16. The method of claim 10, wherein at least some of the visual representations each represent a different number of items.

17. The method of claim 16, wherein the visual representations comprise a different number of at least one of
packages, and
luggage.

18. The method of claim 10, comprising
presenting a menu of available visual representations responsive to passenger input indicating that the passenger needs space allocated to accommodate an item on an elevator car; and
determining which of a plurality of preconfigured representations to present in the menu based on the passenger input.

* * * * *

UNITED STATES PATENT AND TRADEMARK OFFICE
CERTIFICATE OF CORRECTION

PATENT NO. : 9,731,934 B2
APPLICATION NO. : 14/373699
DATED : August 15, 2017
INVENTOR(S) : Jannah A. Stanley et al.

Page 1 of 1

It is certified that error appears in the above-identified patent and that said Letters Patent is hereby corrected as shown below:

In the Claims

In Claim 5, Column 4, Line 45; after "a custodial" insert --item--

In Claim 14, Column 6, Line 11; after "a custodial" insert --item--

Signed and Sealed this
Eleventh Day of June, 2019

Andrei Iancu
*Director of the United States Patent and Trademark Office*